(No Model.) 2 Sheets—Sheet 1.

W. WERNER.
APPARATUS FOR CUTTING OR DIVIDING METAL BARS.

No. 596,837. Patented Jan. 4, 1898.

Witnesses
H. B. Keefer
Vinton Coombs

Inventor
Wilhelm Werner
By James L. Norris.
Attorney

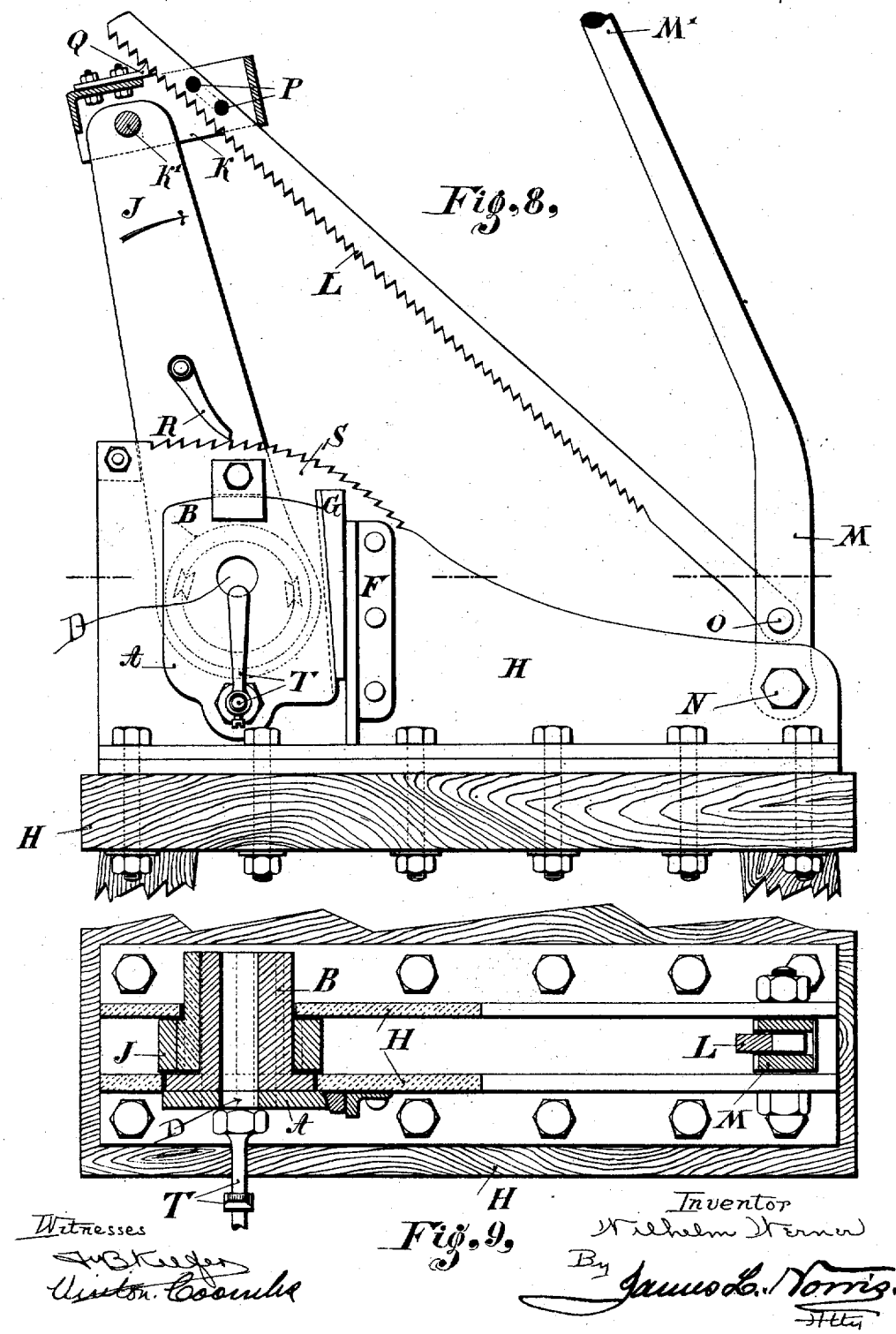

UNITED STATES PATENT OFFICE.

WILHELM WERNER, OF ERFURT, GERMANY, ASSIGNOR TO HUGO JOHN, OF SAME PLACE.

APPARATUS FOR CUTTING OR DIVIDING METAL BARS.

SPECIFICATION forming part of Letters Patent No. 596,837, dated January 4, 1898.

Application filed August 16, 1897. Serial No. 648,447. (No model.)

*To all whom it may concern:*

Be it known that I, WILHELM WERNER, gentleman, a subject of the King of Prussia, Emperor of Germany, residing at Erfurt, in the Kingdom of Prussia and German Empire, have invented new and useful Improvements in Apparatus for Cutting or Dividing Metal Bars or Rods, of which the following is a specification.

Figure 5:
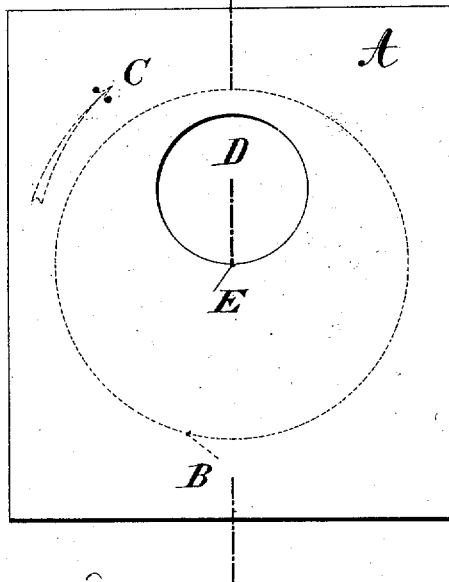
Figure 6:
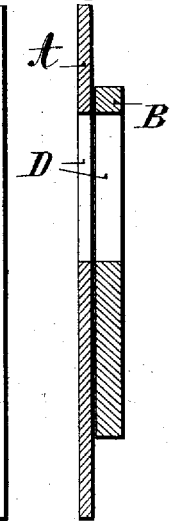
Figure 3:
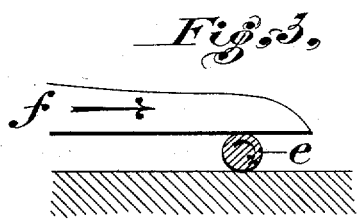
Figure 4:
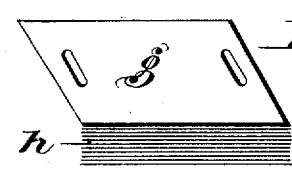
Figure 7:
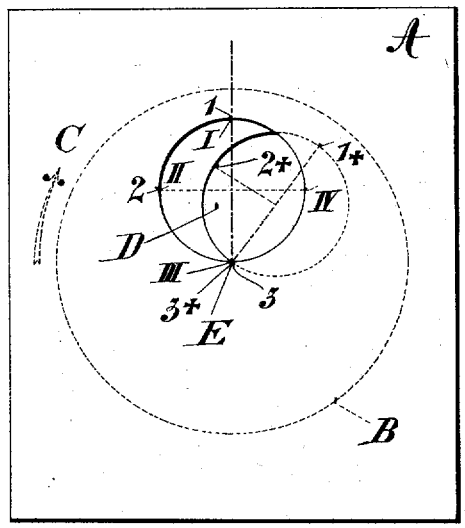

Figures 1 to 4 are diagrammatic views illustrating some old cutting operations hereinafter referred to. Figs. 5 to 7 are views illustrating the arrangement and operation of cutting devices for dividing metal bars according to the principle of my invention. Fig. 8 is a side elevation of my improved machine for dividing metal bars or rods. Fig. 9 is a horizontal section of the same.

Figure 1:
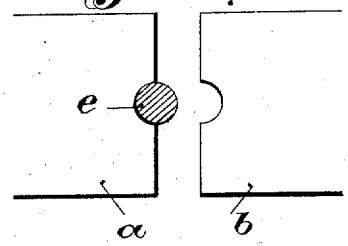
Figure 2:
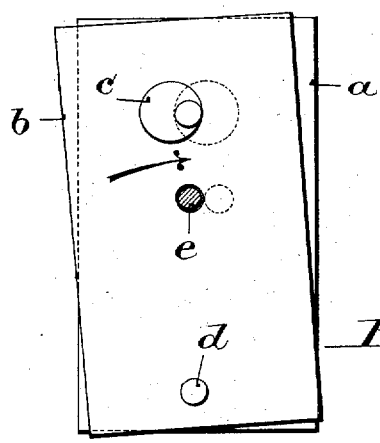

With some previous devices for cutting or dividing iron bars or rods of round, square, or other cross-section a bar to be divided has been laid upon a block $a$, Fig. 1, and the dividing-steel, such as a cutting or shearing plate $b$, has been moved in a straight direction toward the bar to be divided. The movement of the cutting-plate $b$ has been either rectilinear, as indicated in Fig. 1, or curvilinear, the cutting-plate $b$ being rotatable about a pin $d$ by means of a crank or eccentric $c$, Fig. 2, so that the plate $b$ has been rotated toward the block $a$ in an almost straight direction—i. e., in a direction quite or almost perpendicular to the bar $e$ to be divided.

In a machine constructed according to my invention, as illustrated in Figs. 5 to 9, one of the two cutting parts—that is, either the cutting-plate or the abutment-plate—is rotated centrally in relation to the other part; but the cutting-hole is so arranged that a point of its edge lies either exactly or nearly in the axis of rotation of the movable plate or the axis of rotation lies inside the area of the cutting-hole. On the rotation of the movable part the cutting edges in the two parts are gradually shifted in relation to each other and press not only perpendicularly upon the bar to be cut, but also execute a drawing cut in a peculiar way. The part of the bar to be cut off, which lies in the rotating cutting part, participates in this rotation. The bar to be cut is at the end to be divided off rotated about itself through a certain angle—i. e., rotated relatively to the fixed part, and therefore twisted off. In this case there is, in addition, a drawing cut—i. e., the mode of action of the knife $f$ (see Fig. 3)—which presses on the round body $e$ to be cut and is moved forward at the same time in the direction of the arrow, the body to be cut rolling forward simultaneously, and consequently rotating about itself. This mode of operation differs, essentially, from that represented in Fig. 4, which is known, being usual in bookbinding cutting-machines and in which the cutter $g$ does, indeed, move obliquely in relation to the sheets $h$ to be cut, but is pressed with its whole surface upon the sheets. In my machine, on the contrary, the cutting-surfaces of the cutting edge are continually changing.

The cutting parts of my machine are represented in Figs. 5 and 6 in front elevation and cross-section, respectively.

A is the abutment-plate, and B is the cutting-plate, which rotates about itself and which in the present case is constructed as a cylinder. B is rotated in the direction of the arrow C. A and B are each provided with a hole D, which has a cross-section similar to that of the bar to be cut and into which the bar to be divided is inserted. The hole D is placed eccentrically to the center E of the cylinder B and in such a manner that it lies either with a point of its periphery in the axis of rotation E or with such a point only a few millimeters away or the axis of rotation lies within the hole D. In the initial position of the hollow cylinder the cutting-hole D of the cylinder B forms a continuation of that of the abutment-plate A. If now the cylinder B be rotated in relation to the plate A and in the direction of the arrow C, (see Fig. 7,) the following will be the effect: The point 1 of the cutting-plate B, which at first was opposite to the point 1 of the abutment-plate A, after a certain time reaches $1^\times$ and the semicircle 1 2 3 of the plate B reaches $1^\times$ $2^\times$ $3^\times$. The cutting edge consequently moves the quicker the farther it is from the center E, and the cutting-surfaces therefore execute a drawing cut upon the bar to be cut.

In addition to the rotation of the article to be divided in the sense of the arrow C by the cylinder B, there is also a rotation of the bar end to be divided off about itself or about a point 3 of its periphery in relation to the stationarily-held part of the bar, whence results the distortion of the fibers of the bar at the dividing-place, and consequently the twisting off of the required part of the bar. It is therefore characteristic of this invention that the bar to be divided is held by a cylinder B, whose cutting edges are in contact with the cutting-plate A and is centrally rotated, the cutting-hole D being located so eccentrically that the axis of rotation E lies quite or nearly in its periphery.

A machine constructed according to this invention is represented in Figs. 8 and 9. The plate A is fixed, and in the machine shown it is adjusted so as to be exactly concentric to the cylinder B by means of a wedge G, that bears against an angle-piece F. The cylinder B is centrally rotatable in a frame H and is secured to a long lever J, whose rotation in the sense of the arrow is caused by mechanism that will now be described.

On the pin K' there is rotatably mounted a cap K, that receives a toothed detent-rack L, which is rotatable at O on the hand-lever M, near the fulcrum N of the latter. The rack L can be fixed in the cap K by means of pins P; but the detaining-pins P may be removed and the cap be then coupled with the rack L according to one direction of movement by means of a detent Q. The mode of operation is consequently as follows: When the rack L and the cap K are firmly coupled by the detaining-pins P and the hand-lever M is moved, the latter pulls the lever J in the lever ratio $\frac{NM'}{NO}$, (the toothed rod L is a rigid connection), and in consequence of this the hollow cylinder B is rotated comparatively quickly. In cutting thicker bars the detaining-pins P are removed, and the rack L is then adjusted relatively to the cap K, so that the hand-lever M can be brought repeatedly toward the lever J, with the result that the lever J is gradually drawn in the direction of the arrow in the drawing. A detent R may be employed in this case to keep the cylinder B home during its rotation—i. e., to prevent it from rotating backward during the cutting. The detent R engages in a curved detent-rack S on an edge of the frame of the machine.

The justifying device T serves for determining the length to be cut off.

Having now particularly described and ascertained the nature of the said invention and in what manner the same is to be performed, I declare that what I claim is—

1. In a machine for cutting metal bars or rods, the combination of the frame H having the detent-rack S, the stationary plate A having therein a hole D provided with cutting edges, the centrally fulcrumed and rotatable hollow cylinder B provided with a hole corresponding to and normally in line with the hole of plate A and arranged eccentric to the cylinder-axis, the angle-piece F and wedge G, and a lever J mounted on said cylinder and provided with a pawl R to engage the detent-rack of the said frame, substantially as described.

2. In a machine for cutting metal bars or rods, the combination of the frame H having the detent-rack S, the centrally-rotatable hollow cylinder B mounted in said frame, the stationary but adjustable plate A, said cylinder and plate being provided with coinciding holes D having cutting edges and the said hole of the cylinder being eccentric to the cylinder-axis, the lever J mounted on the cylinder B and provided with pawl R engaged with detent-rack S, the cap K rotatable on lever J and provided with detent Q, the detent-rack L, and the lever M for actuating said rack, substantially as described.

In testimony whereof I have hereunto set my hand in presence of two subscribing witnesses.

WILHELM WERNER.

Witnesses:
MAX MEYER,
FRIEDRICH BECK.